United States Patent
Trapasso et al.

(10) Patent No.: US 7,104,119 B1
(45) Date of Patent: Sep. 12, 2006

(54) METHOD AND APPARATUS FOR DETERMINING ROTARY POSITION

(75) Inventors: David J. Trapasso, Bloomfield, NY (US); Murri H. Decker, Phelps, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/074,961

(22) Filed: Mar. 8, 2005

(51) Int. Cl.
*G01M 15/00* (2006.01)
(52) U.S. Cl. .................................... 73/117.3
(58) Field of Classification Search ............... 73/116, 73/117.2, 117.3, 118.1; 701/29, 101, 102, 701/110, 111
See application file for complete search history.

(56) References Cited

U.S. PATENT DOCUMENTS

| | | | | |
|---|---|---|---|---|
| 4,409,548 A | * | 10/1983 | Focht ........................... | 324/168 |
| 4,558,591 A | * | 12/1985 | Francis et al. ................. | 73/116 |
| 4,742,332 A | * | 5/1988 | Schroeder et al. ............. | 341/15 |
| 4,866,269 A | * | 9/1989 | Wlodarczyk et al. ... | 250/231.18 |
| 5,070,727 A | * | 12/1991 | Davis et al. ................... | 73/116 |
| 5,559,705 A | * | 9/1996 | McClish et al. ............. | 701/110 |
| 6,208,131 B1 | * | 3/2001 | Cebis et al. ................. | 324/165 |
| 6,494,086 B1 | * | 12/2002 | Ponti ........................... | 73/116 |
| 6,566,867 B1 | * | 5/2003 | Schroeder et al. ..... | 324/207.22 |
| 6,744,248 B1 | * | 6/2004 | Buchhold et al. ...... | 324/207.21 |
| 2003/0128027 A1 | * | 7/2003 | Buchhold et al. ...... | 324/207.21 |

* cited by examiner

*Primary Examiner*—Eric S. McCall
(74) *Attorney, Agent, or Firm*—Paul L. Marshall

(57) ABSTRACT

A system for determining the angular position of a rotating element such as an engine crankshaft. An encoder wheel is divided into a plurality of equal-angle segments, each comprising a peripheral tooth extending radially over a central angle representing an angular percentage of each segment. The total angle in each segment is a tooth dwell angle and a gap dwell angle. The ratio of the tooth dwell angle to the total segment angle is the duty cycle. A prime segment is given a first tooth dwell angle. Each segment has a unique tooth dwell angle. As the wheel rotates, a sensor begins timing at a first tooth rise and determines the time to the first tooth fall and the time to the second tooth rise. Since each duty cycle is unique, for a wheel having 45 degree segments the system can determine the segment being interrogated within 90 rotational degrees.

28 Claims, 4 Drawing Sheets

| Encoder Position Degrees | DutyCycle | Tooth Dwell Degrees | Space Dwell Degrees |
|---|---|---|---|
| 0 | 10.0% | 4.5 | 40.5 |
| 45 | 21.3% | 9.6 | 35.4 |
| 90 | 32.8% | 14.8 | 30.2 |
| 135 | 44.2% | 19.9 | 25.1 |
| 180 | 55.7% | 25.1 | 19.9 |
| 225 | 67.1% | 30.2 | 14.8 |
| 270 | 78.6% | 35.4 | 9.6 |
| 315 | 90.0% | 40.5 | 4.5 |

FIG. 1

METHOD AND APPARATUS FOR DETERMINING ROTARY POSITION

TECHNICAL FIELD

The present invention relates to a method and apparatus for determining the dynamic angular position of a rotary element with respect to a reference position; more particularly, to encoder sensing systems for determining the angular position of the crankshaft of an internal combustion engine; and most particularly, to such a system wherein a position determination can be made within a small fraction of a single revolution of the crankshaft.

BACKGROUND OF THE INVENTION

Position sensors are required for modern automobile engine control systems to detect the angular position of the crankshaft. A vehicle's engine controller uses this information to calculate the optimal times to fire fuel injectors and, for spark ignited engines, ignition discharge. The information is also useful for diagnosing malfunctions such as misfire, which typically is done by detecting a rapid change in angular velocity.

Prior art sensors for measuring rotary position typically incorporate encoders, resolvers, or potentiometers. In the hostile environment of automotive engines, incremental encoders of some form are typically used. Other types of position sensors are typically analog in nature and have poor noise immunity and/or drift with temperature changes, and sometimes have wear-prone brushes. Encoders have the advantage of being simple and reliable even when subjected to temperature extremes.

They require only a single timer/counter channel of a vehicle's controller to function and therefore are also inexpensive.

An incremental encoder is typically constructed as a series of spaced-apart features such as alternating teeth and notches around the circumference of a wheel connected to a rotating device such as a crankshaft. The wheel may be formed as a part of the apparatus, for example, an engine flywheel may be formed as an encoder wheel. As the wheel spins, a pickup sensor mounted in close proximity to the wheel detects each feature as it passes by the pickup, for example, by chopping of an optical beam or variation in magnetic field, and generates a square wave response. An index pulse function is typically present to identify an absolute or reference position of the wheel, such as top dead center of the No. 1 engine piston. This sometimes consists of two features more closely spaced than the other features. The reference position also may be established externally by a feature on an engine camshaft which is synchronized to the crankshaft at one-half its angular velocity.

A known problem exists in using prior art systems when starting an engine. The index feature must be found in order to synchronize the engine control system, which can require up to one full revolution of the engine to locate the index feature on the crankshaft or two full engine revolutions to locate the index feature on the camshaft. This represents time delay in starting the engine.

Although prior art absolute encoder technology is well known, such an encoder system requires multiple inputs in a controller for each bit of resolution desired. For example, an encoder with three bits requires a more complex wheel, three wires, connections, and inputs, adding to the cost while decreasing the reliability. An encoder with three bits of resolution provides an angular resolution of $360/2^3$ degrees, equals 45 degrees.

Another prior art technology uses a series of unevenly spaced features and pulses. By searching for a pattern of spacing, the position can be established in this fashion. Such a system typically requires a plurality of pulses before the position can be identified. Although this may be an improvement over waiting for an index pulse, this system typically requires up to one-half an engine revolution (180 degrees) before the position can be established.

What is needed in the art is a method and apparatus for determining rotary position of a rotatable element in a small fraction of a single revolution, preferably within 45 degrees or less.

It is a principal object of the present invention to determine the rotary position of a rotatable element within a small fraction of a single revolution of the element.

It is a further object of the invention to minimize the time required for an internal combustion engine control system to determine the angular position of the engine at start-up.

SUMMARY OF THE INVENTION

Briefly described, an encoder wheel is divided into a plurality of equal-angle segments, for example eight segments of 45 degrees each. Each segment comprises a peripheral tooth extending over a fixed central angle representing a percentage of the dwell in each segment. Thus the total angle in each segment comprises a tooth dwell angle and a gap dwell angle. The ratio of the tooth dwell angle to the total segment angle (which segment angle is known and is a constant for all segments) is the duty cycle. A first segment is arbitrarily designated as a prime segment and is given a minimum tooth dwell angle. The succeeding segments in the counter-rotation direction are given progressively greater tooth dwell angles. As the wheel begins to rotate, the sensor begins timing at a first tooth rise and determines the time to the first tooth fall (numerator of the duty cycle) and the time from the first tooth rise to the second tooth rise (denominator of the duty cycle). Since each duty cycle is unique and is independent of rotation speed, for wheel having 45 degree segments, for example, the system can determine the angular position of the wheel within no more than 90 degrees of rotation and as few as 45 degrees of rotation. The greater the segmental division of the wheel, the smaller the revolution angle required to determine the angular position, up to the reliable detection of the teeth.

BRIEF DESCRIPTION OF THE DRAWINGS

The present invention will now be described, by way of example, with reference to the accompanying drawings, in which:

FIG. 1 is a table showing exemplary division of an encoder wheel into eight segments, a duty cycle unique to each segment, and the corresponding tooth and gap dwell angles;

DESCRIPTION OF THE PREFERRED EMBODIMENTS

Figure 2:
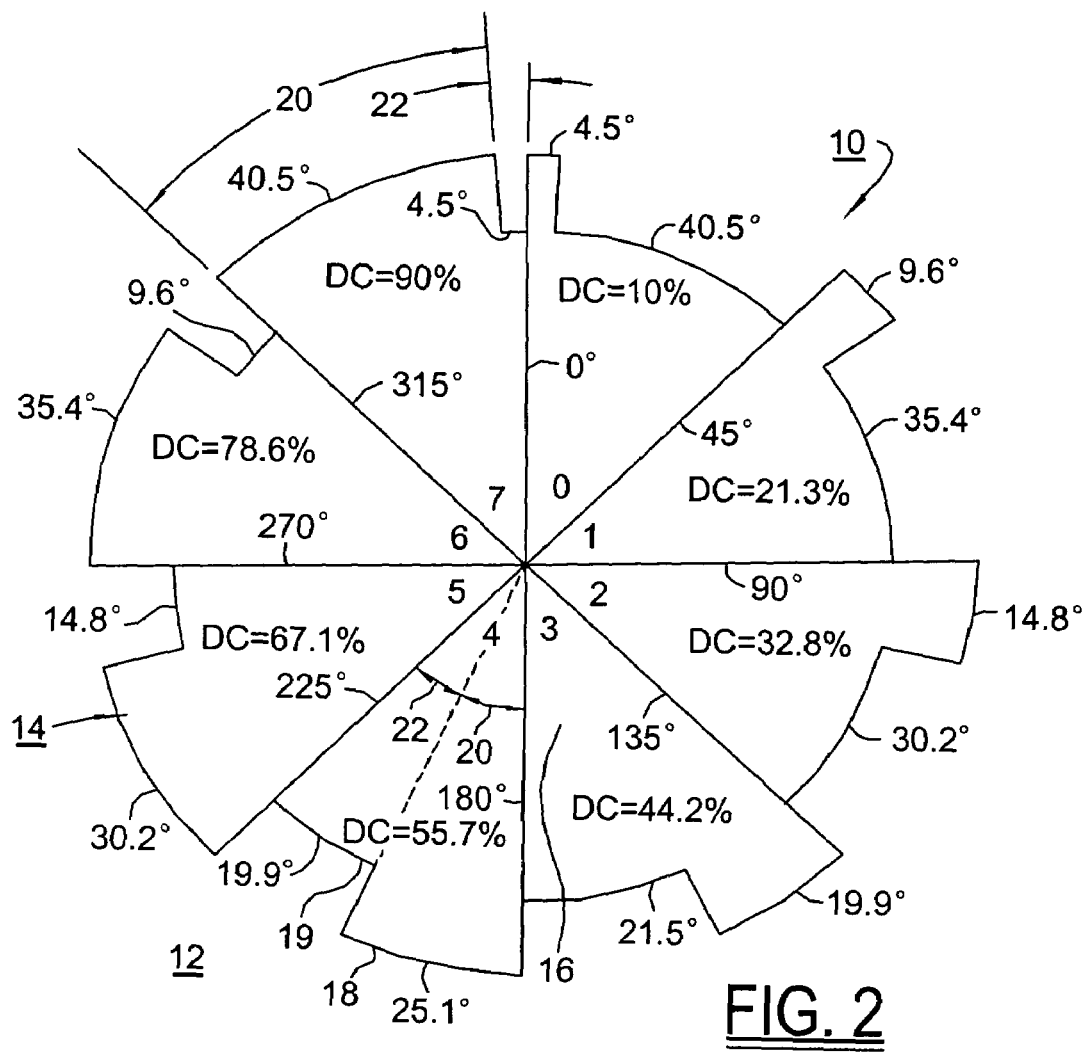
FIG. 2 is a plan view of an encoder wheel constructed in accordance with the table shown in FIG. 1.

Referring to FIGS. 1 and 2, an exemplary encoder wheel 10 is suitable for mounting on a rotating object whereof the angular position must be determined at any given time. An especially suitable use is for determining the angular position of a crankshaft or a camshaft of an internal combustion engine 12 such as a compression ignited (CI) engine or a spark ignited (SI) engine. Wheel 10 is mounted coaxially with the appropriate shaft on a standoff therefrom, as is known for prior art encoder wheels. During rotation of wheel 10, peripheral region 14 of wheel 10 may be interrogated conventionally as by a light beam, magnetic coupling, or the like (not shown) to generate an intermittent signal from a sensor (not shown) in known fashion.

Wheel 10 comprises a central hub portion 16 and peripheral region 14. Wheel 10 is exemplarily divided into a plurality of equal-angle segments, for example, eight segments of 45 degrees each, labeled with segment identification numbers 0 through 7 in FIG. 2. Each segment comprises a peripheral tooth 18 and a gap or notch 19, each extending over a central angle representing a percentage of the dwell in each segment, as shown in FIG. 1. Thus the total angle in each segment comprises a tooth dwell angle 20 and a gap dwell angle 22. It will be understood and appreciated that the tooth may cause a signal to be prevented from generation, and the gap may cause a signal to be generated. Each of the segments has a unique tooth dwell angle. For instance, in the particular embodiment shown in FIG. 2, a first segment is arbitrarily designated as a prime segment and is given a minimum tooth dwell angle relative to the remaining segments. Each succeeding segments in the counter-rotation direction are given progressively greater tooth dwell angles. (Note that in use wheel 10 as shown in FIG. 1 is intended for rotation in a counter-clockwise direction past a stationary source and sensor.) In other words, when wheel 10 is stationary, succeeding segments in the clockwise direction may be given progressively greater tooth dwell angles relative to the minimum tooth dwell angle of the prime segment. The ratio of the tooth dwell angle 20 to the total segment angle, 45°, defines the duty cycle, which represents the percentage of the time in a segment in which an interrogating beam is occluded by the segment tooth.

In an engine application, the number of segments may be governed by the number of cylinders. For example, four segments are acceptable for a four-cylinder engine, but eight segments are better for greater resolution (shorter rotation angle to segment determination). Similarly, a six-cylinder engine may use a six- or twelve-segment wheel (or higher multiples of six), and an eight-cylinder engine may use an eight- or sixteen-segment wheel. Of course, a 48-segment wheel having 7.50° segments is universally useful for four-, six-, eight-, twelve-, and sixteen-cylinder engines.

The greater the segmental division of the wheel, the smaller the revolution angle required to determine the angular position, up to the reliable detection of the teeth. The practical number of segments is determined in part by the diameter of the wheel (the larger the better), the resolution of the sensor (optical is generally better than magnetic), and the rotational uniformity of the device being measured. For example, an eight-cylinder engine runs more smoothly than a four-cylinder engine. If the encoder teeth are cast as features on an engine flywheel, which has a relatively large diameter, sixteen or even 32 segments may be practical on an eight-cylinder engine when using a magnetic sensor. A smooth-running system with a massive load driven by an electric motor may practically have even more segments. In principle, more than 100 segments are possible. Thus, the practical range of duty cycles may be greater than 0% to just less than 100%.

Figure 3:
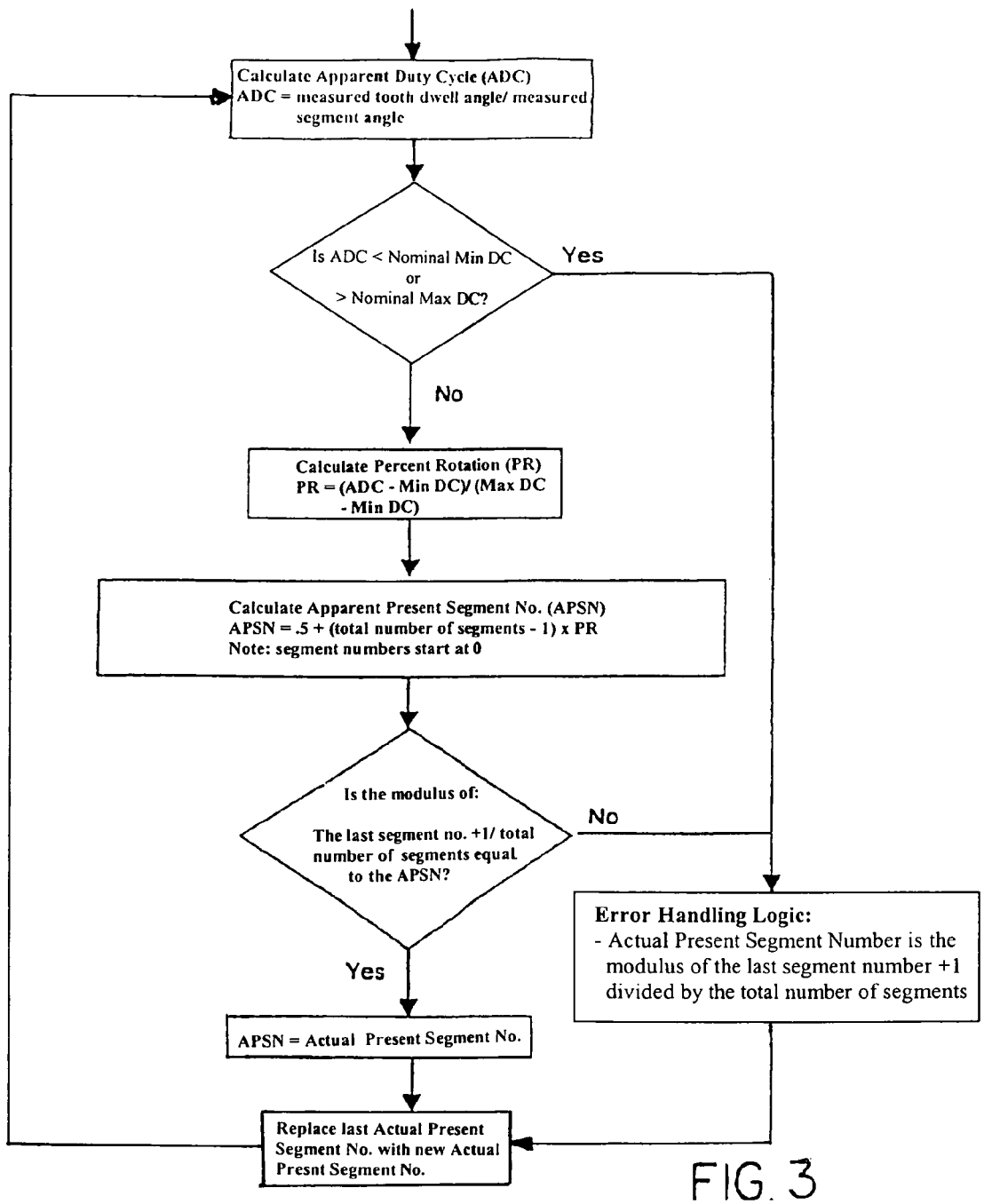
FIG. 3 is an exemplary decoding algorithm suitable for use with an encoder such as is shown in FIGS. 1 and 2.

In operation, as the wheel begins to rotate, the sensor begins timing at a first tooth rise (onset of occlusion) and determines the time to the first tooth fall (numerator of the duty cycle) and also the time from the first tooth rise to the second tooth rise (start of the next segment, and denominator of the duty cycle). Since each duty cycle is unique and is independent of rotation speed, for a 45 degree segment wheel the system can determine the angular position of the wheel within less than 90 degrees of rotation. For example, if interrogation begins with the beam occluded, the wheel must rotate through the remainder of that tooth dwell angle plus the gap angle following it before reaching the next tooth rise, at which point the determining algorithm, as shown in FIG. 3, begins to identify which segment is currently being interrogated. Although the duty cycle for each segment is unique, because of variations in speed the measured duty cycle may not correspond exactly to one of the unique duty cycles of the segments. It is important, therefore, to confirm that the inferred position is correct by comparing it to the last segment that was identified.

At the sensing of a rising edge interrupt, the algorith follows the following logic:

1) Calculate an Apparent (i.e., measured) Duty Cycle of the present segment by dividing the tooth occlusion time (tooth dwell) by the measured period of the full segment (time between consecutive rise interrupts).

2) Determine whether the Apparent Duty Cycle of the present segment is outside a nominal range of the wheel. Outside the nominal range of the wheel would be less than a nominal minimum Duty Cycle (e.g., 5% Duty Cycle) or greater than a nominal maximum Duty Cycle (e.g., 95% Duty Cycle)). If the Duty Cycle of the present segment is outside the nominal range of the wheel, then the method proceeds to an error handling subroutine, wherein the actual present segment number is computed to be equal to the modulus of the last Apparent Segment Number plus 1 divided by the total number of segments per revolution. If the Duty Cycle of the present segment is not outside the nominal range of the wheel, the method proceeds to step #3.

3) Calculate the Percent Rotation during the measured occlusion time by taking the Apparent Duty Cycle minus the minimum Duty Cycle of the wheel divided by the maximum Duty Cycle minus the minimum Duty Cycle. The minimum Duty Cycle is the duty cycle of the prime segment and the maximum Duty Cycle is the duty cycle of the segment with the largest duty cycle relative to the other segments (i.e., the duty cycle of segment identification number 7).

4) Calculate the Apparent Present Segment Number by subtracting 1 from the total number of segments per revolution, multiply by the Percent Rotation, add 0.5, and take the integer value, which represents the present segment identification number for the present segment. Note that, for purposes of this calculation, the segment identification numbers begin with 0 as best seen in FIG. 2.

5) If the modulus (i.e., remainder) of the last segment number plus 1 divided by the number of segments per revolution is unequal to the Apparent Present Segment Number, then the method proceeds to the error handling subroutine, wherein the actual present segment number is computed to be equal to the modulus of the last Apparent Segment Number plus 1 divided by the total number of segments per revolution. The method then proceeds to step #6. If the modulus is equal to the Apparent Present Segment Number, the Apparent Present Segment Number is confirmed to be the actual present segment number and the method proceeds to step #6.

6) Replace the last Actual Present Segment Number as set forth in step #5 with the new Present Segment Number and return to step #1 for identifying the next segment.

The present invention may also include a second embodiment that operates to determine the angular position of a rotating device. In general, the alternative method establishes the Apparent Duty Cycle of one of the segments and then matches the Apparent Duty Cycle with one or more unique duty cycles associated with each of the segments that are stored in a memory location. In other words, the second embodiment comprises a look-up table including the unique duty cycles associated with each of the segments on the wheel that may be matched with the Apparent Duty Cycle to identify the current position of the rotating device.

Figure 4:
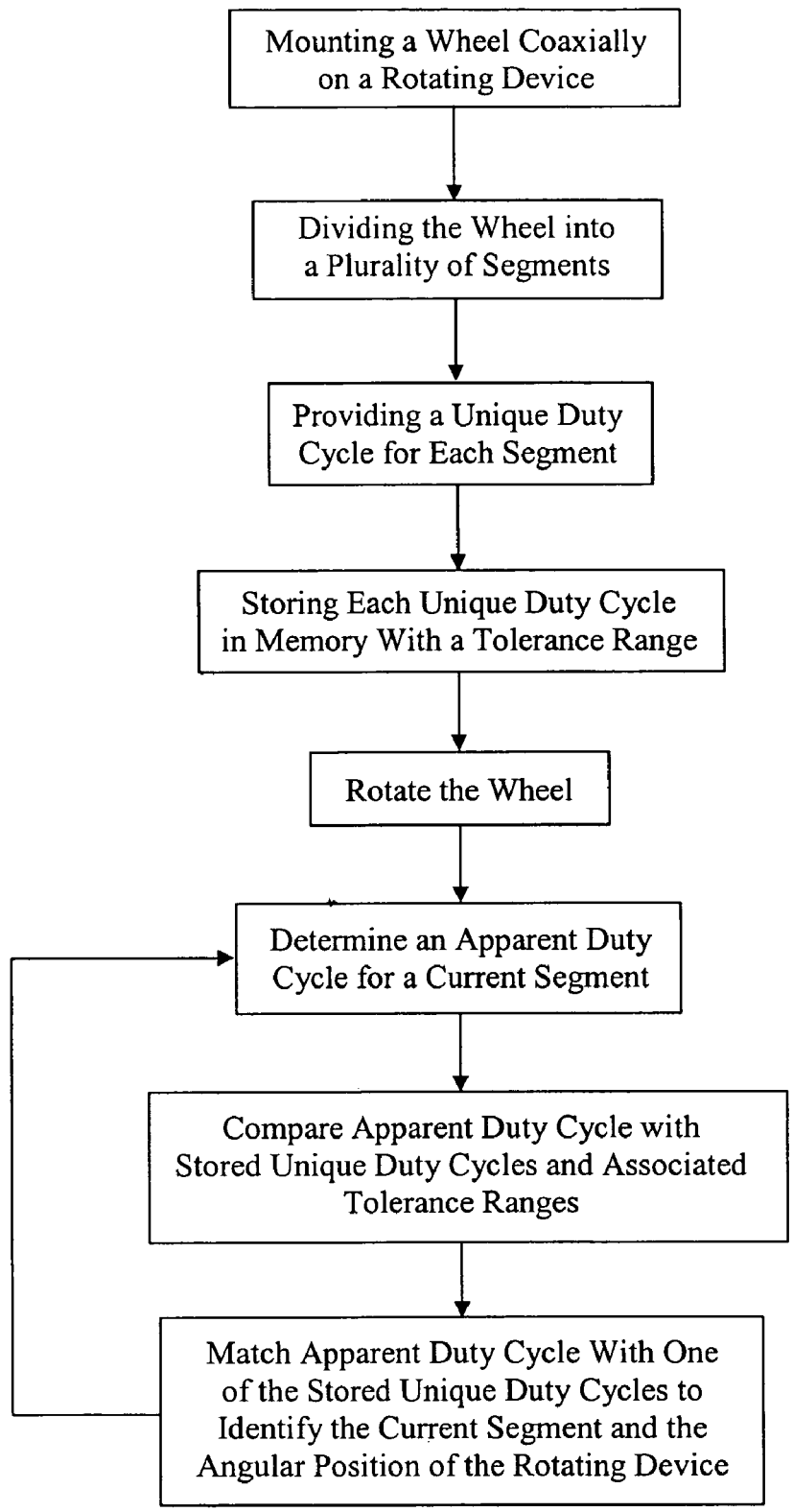
FIG. 4 is a flow chart showing a second embodiment of the method of the present invention.

As best seen in FIG. 4, the method of the second embodiment may provide an encoder wheel mounted coaxially on the device. The encoder wheel is divided into a plurality of segments, wherein each segment has a total segment angle comprising a tooth dwell angle and a gap dwell angle. Each of the plurality of segments is provided with a unique dwell angle thereby establishing a unique duty cycle that corresponds to each segment. The segments may be provided with progressively greater tooth dwell angles, but it will be understood that such a progressive increase in tooth dwell angles is not required so long as each segment has a unique duty cycle. As stated above, the duty cycle is the ratio of the tooth dwell angle to the total segment angle. In accordance with the second embodiment, each of the unique duty cycles is stored in a memory, such as a storage device.

In implementing the second method, a tooth dwell angle time for a first segment is determined using a timing sensor as the wheel is rotating, wherein the first segment is one of the segments on wheel 10. The tooth dwell angle time for the first segment starts at the beginning of the tooth dwell angle of the first segment and ends at the end of the tooth dwell angle for the first segment. A total segment angle time is then determined using the sensor for the first segment as the wheel is rotating. The total segment time for the first segment starts at the beginning of the tooth dwell angle for the first segment and ends at the end of the gap dwell angle for the first segment. The tooth dwell angle time is then divided by the total segment angle time to establish a first Apparent Duty Cycle. The first Apparent Duty Cycle is then compared with at least one of the unique duty cycles of the segments in the look-up table stored in memory. The first Apparent Duty Cycle is then matched with one of the stored unique duty cycle having an equivalent value to identify the first segment and thereby determine the angular position of the rotating device.

The second embodiment also may include a tolerance range for each of the unique duty cycles stored in the look-up table. The tolerance range may be, for example, ±5°, or any other degree range, so long as the tolerance ranges for different segments do not overlap with one another so that they cover the same duty cycle value. Therefore, if the Apparent Duty Cycle is not equivalent to one of the stored unique duty cycles, but falls within a tolerance range for one of the unique duty cycles, then the Apparent Duty Cycle will be matched with the unique duty cycle that corresponds to the tolerance range that the Apparent Duty Cycle falls within.

The method and apparatus of the present invention for determining rotary position of a rotating object can be useful in a wide variety of applications.

As disclosed above, engine uses with crankshafts can regulate timing of fuel injection and spark ignition, and can detect mis-firings, resulting in faster starting of engines and lower hydrocarbon emissions at start-up.

When used on an engine's camshaft in addition to the crankshaft, the two sensors can cross-check each other for onboard diagnostics, and redundancy allows each to function alone in event of failure of the other. This feature also allows a vehicle to be driven until it can be serviced. In small or less expensive engines, the crankshaft encoder may be eliminated in favor of a single camshaft encoder.

The present encoder system may be mounted on the wheels of a vehicle. Rough road surface can cause instantaneous variations in wheel rotational velocity that can be detected and quantified to permit, for example, auto-adjustment of vehicle suspension. Further, low tire inflation pressure can be detected, as a low-inflation tire has a functionally smaller diameter and thus will indicate an excessive rotation rate relative to the other tires. Further, the present encoder system can be useful in managing an antilock braking system by measuring the actual rotational velocity and velocity variations of any wheel.

The present encoder wheel, when mounted on the rotor of a camshaft phaser can be useful in managing the action of the phaser.

Further, a low-cost (single bit) servo actuator feedback sensor employing an encoder wheel in accordance with the invention can detect rotation automatically in either direction and therefore can be used to determine the position of motorized actuators for vehicle windows, doors, antennas, headlamps, and wipers, and can easily be applied to hydraulic actuators rather than electric actuators.

In the field of consumer electronics, a rotary position sensor can be useful in managing the action of a video cassette recorder, a digital video disk player or recorder, a garage door opener, and the like.

The wheel embodiment 10 discussed above is essentially an optical beam chopper or a magnetic field chopper. Obviously, however, the invention fully anticipates and embraces encoder wheels formed not with alternative teeth and gaps but rather with alternating signal means such as magnets, fluorescent materials, radioactive materials, and the like, all of which may act to generate an alternating signal in an appropriate associated sensor.

Note that an encoder wheel in accordance with the invention may be inherently unbalanced rotationally, that is, the geometric center of wheel hub 16 is not necessarily coincident with the center of mass of wheel 10. Hence, it may be necessary to balance the wheel itself in known fashion to compensate for the unbalancing effect of the teeth, for example, by shortening the radii of gaps 19 such that the wheel has equal radius to the center of mass in each segment, when the wheel is to be used in critical, high-speed applications such as on a crankshaft or a camshaft.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An encoder system for determining the angular position of a rotating device, comprising an encoder wheel mountable coaxially on said device and having a plurality of angular segments subtending a plurality of central angles of said wheel, each segment including a tooth extending from a periphery of said wheel over a first predetermined central angle of said wheel for causing a signal to be prevented from generation and a gap between adjacent of said teeth extending over a second predetermined central angle of said wheel for causing a signal to be generated and wherein said first and second predetermined central angles comprise the total central angle of said segment,
   wherein said tooth extends over an angular percentage of said respective segment,
   wherein said angular percentage of said tooth defines a duty cycle for said segment, and
   wherein each of said segment duty cycles is unique.

2. An encoder system in accordance with claim 1 wherein the central angles of said plurality of segments are equal.

3. An encoder system in accordance with claim 1 wherein the number of said segments is between 2 and 100.

4. An encoder system in accordance with claim 3 wherein the number of said segments is 48, each segment having a central angle of 7.5°.

5. An encoder system in accordance with claim 1 wherein said plurality of segments are arranged angularly on said wheel according to increasing sizes of said unique duty cycles.

6. An encoder system in accordance with claim 1 wherein the size of each duty cycle is in a range between greater than 0% and less than 100%.

7. An internal combustion engine comprising an encoder system for determining the angular position of a rotating element of said engine, said system including an encoder wheel having a plurality of angular segments subtending a plurality of central angles of said wheel, each segment including a tooth extending from a periphery of said wheel over a first predetermined central angle of said wheel for causing a signal to be prevented from generation and a gap between adjacent of said teeth extending over a second predetermined central angle of said wheel for causing a signal to be generated and wherein said first and second predetermined central angles comprise the total central angle of said segment, wherein said tooth extends over an angular percentage of said respective segment, wherein said angular percentage of said tooth defines a duty cycle for said segment, and wherein each of said segment duty cycles is unique.

8. An engine in accordance with claim 7 wherein said rotating element of said engine is selected from the group consisting of crankshaft, camshaft, camshaft phaser, and any combination thereof.

9. An engine in accordance with claim 7 wherein the number of segments in said wheel is an integral multiple of the number of cylinders in said engine.

10. An encoder system for determining the angular position of a rotating device, comprising an encoder wheel mountable coaxially on said device and having a plurality of angular segments subtending a plurality of central angles of said wheel, each segment including a tooth for causing a signal to be prevented from generation and a notch defined in said tooth for causing a signal to be generated,
    wherein said tooth extends over an angular percentage of a segment and said notch extends over the remaining angular percentage of said segment, and
    wherein said angular percentage of said tooth defines a duty cycle for said segment, and
    wherein each of said segment duty cycles is unique.

11. An encoder system in accordance with claim 10 wherein said tooth extends from the periphery of said wheel over a first predetermined central angle of said wheel, and wherein said notch is between adjacent of said teeth extending over a second predetermined central angle of said wheel, and wherein said first and second predetermined central angles comprise the total central angle of said segment.

12. An encoder system in accordance with claim 10 wherein the central angles of said plurality of segments are equal.

13. An encoder system in accordance with claim 10 wherein the number of said segments is between 2 and 100.

14. An encoder system in accordance with claim 13 wherein the number of said segments is 48, each segment having a central angle of 7.5°.

15. An encoder system in accordance with claim 10 wherein said plurality of segments are arranged angularly on said wheel according to increasing sizes of said unique duty cycles.

16. An encoder system in accordance with claim 10 wherein the size of each duty cycle is in a range between greater than 0% and less than 100%.

17. A method for determining the angular position of a rotating device, the method comprising:
    providing a wheel mounted coaxially on the device;
    dividing the wheel into a plurality of segments, each segment having a total segment angle comprising a tooth dwell angle and a gap dwell angle;
    designating one of the segments as a prime segment having a minimum tooth dwell angle;
    providing succeeding segments relative to the prime segment with progressively greater tooth dwell angles thereby establishing a unique duty cycle for each segment, the duty cycle being the ratio of the tooth dwell angle to the total segment angle, wherein the primary segment includes a minimum duty cycle, and wherein one of the segments other than the primary segment has a maximum duty cycle;
    providing each of the segments with a segment identification number, wherein the prime segment's identification number is zero, and wherein the succeeding segments from the prime segment are designated with progressively greater segment identification numbers that are integers,
    determining a tooth dwell angle time for a first segment as the wheel is rotating, the first segment being one of the segments, the tooth dwell angle time for the first segment starting at the beginning of the tooth dwell angle of the first segment and ending at the end of the tooth dwell angle for the first segment;
    determining a total segment angle time for the first segment as the wheel is rotating, the total segment time for the first segment starting at the beginning of the tooth dwell angle for the first segment and ending at the end of the gap dwell angle for the first segment;
    dividing the tooth dwell angle time by the total segment angle time to establish a first apparent duty cycle;
    establishing a first percent rotation by dividing the difference between the first apparent duty cycle and the minimum duty cycle by the difference between the maximum duty cycle and the minimum duty cycle;
    determining the apparent segment identification number of the first segment by subtracting 1 from the total number of segments on the wheel, multiplying by the first percent rotation, adding 0.5, and taking the resulting integer value, which represents an actual segment identification number of the first segment thereby determining the angular position of the rotating device.

18. The method in accordance with claim 17 further comprising:
comparing the first apparent duty cycle with a nominal minimum duty cycle and a nominal maximum duty cycle; and
determining that the first apparent duty cycle is greater than the nominal minimum duty cycle and less than the nominal maximum duty cycle.

19. The method in accordance with claim 17 further comprising:
determining a tooth dwell angle time for a second segment as the wheel is rotating, the second segment being one of the segments other than the first segment, the tooth dwell angle time for the second segment starting at the beginning of the tooth dwell angle of the second segment and ending at the end of the tooth dwell angle for the second segment;
determining a total segment angle time for the second segment as the wheel is rotating, the total segment time for the second segment starting at the beginning of the tooth dwell angle for the second segment and ending at the end of the gap dwell angle for the second segment;
dividing the tooth dwell angle time of the second segment by the total segment angle time of the second segment to establish a second apparent duty cycle;
establishing a second percent rotation by dividing the difference between the second apparent duty cycle and the minimum duty cycle by the difference between the maximum duty cycle and the minimum duty cycle;
determining the apparent segment identification number of the second segment by subtracting 1 from the total number of segments on the wheel, multiplying by the second percent rotation, adding 0.5, and taking the resulting integer value, which represents the apparent segment identification number of the second segment thereby determining the angular position of the rotating device; and
confirming that the apparent segment identification number for the second segment is an actual segment identification of the second segment by determining that the modulus of the actual segment identification number of the first segment plus 1 divided by the total number of segments is equal to the apparent segment identification number of the second segment.

20. The method in accordance with claim 19 further comprising:
comparing the second apparent duty cycle with the minimum duty cycle and the maximum duty cycle;
determining that the second apparent duty cycle is one of less than the minimum duty cycle and greater than the maximum duty cycle; and
establishing the actual segment identification number of the second segment as the modulus of the actual segment identification number of the first segment plus 1 divided by the total number of segments on the wheel.

21. The method in accordance with claim 19 further comprising:
determining that the modulus of the actual segment identification number of the first segment plus 1 divided by the total number of segments is not equal to the apparent segment identification number of the second segment;
establishing the actual segment identification number of the second segment as the modulus of the actual segment identification number of the first segment plus 1 divided by the total number of segments on the wheel.

22. The method in accordance with claim 17 wherein the wheel is an encoder wheel, the method further comprising:
providing a timing sensor that is associated with the encoder wheel;
using the sensor to determine the tooth dwell angle time for at least one of the segments; and
using the sensor to determine the total segment angle time for at least one of the segments.

23. The method in accordance with claim 17 wherein the total segment angles of each segment are equal.

24. The method in accordance with claim 17 wherein the number of segments is between 2 and 100.

25. The method in accordance with claim 17 wherein the size of the duty cycle of each segment is in a range between greater than 0% and less than 100%.

26. A method for determining the angular position of a rotating device, the method comprising:
providing an encoder wheel mounted coaxially on the device;
dividing the encoder wheel into a plurality of segments, each segment having a total segment angle comprising a tooth dwell angle and a gap dwell angle;
providing each of said plurality of segments with a unique tooth dwell angle thereby establishing a unique duty cycle for each segment, the duty cycle being the ratio of the tooth dwell angle to the total segment angle, each of the unique duty cycles being stored in a memory;
determining a tooth dwell angle time for a first segment as the wheel is rotating, the first segment being one of the segments, the tooth dwell angle time for the first segment starting at the beginning of the tooth dwell angle of the first segment and ending at the end of the tooth dwell angle for the first segment;
determining a total segment angle time for the first segment as the wheel is rotating, the total segment time for the first segment starting at the beginning of the tooth dwell angle for the first segment and ending at the end of the gap dwell angle for the first segment;
dividing the tooth dwell angle time by the total segment angle time to establish a first apparent duty cycle, wherein the first apparent duty cycle is compared with at least one of the unique duty cycles stored in memory; and
matching the first measured duty cycle with one of the stored unique duty cycles to identify the first segment and thereby determine the angular position of the rotating device.

27. The method in accordance with claim 26 further comprising:
providing a timing sensor that is associated with the encoder wheel;
using the sensor to determine the tooth dwell angle time for at least one of the segments; and
using the sensor to determine the total segment angle time for at least one of the segments.

28. The method in accordance with claim 26 wherein each of the unique duty cycles stored in memory have a tolerance range associated therewith, and wherein the first apparent duty cycle is matched with one of the unique duty cycles if the first apparent duty cycle falls within one of the tolerance ranges for the unique duty cycles.

* * * * *